United States Patent
Heimerdinger et al.

(10) Patent No.: US 10,906,289 B2
(45) Date of Patent: Feb. 2, 2021

(54) METHOD AND DEVICE FOR PRODUCING COMPONENTS HAVING DEFINED DIMENSIONS

(71) Applicant: PREMIUM AEROTEC GMBH, Augsburg (DE)

(72) Inventors: Christoph Heimerdinger, Augsburg (DE); Matthias Leidescher, Augsburg (DE); Matthias Bensch, Augsburg (DE)

(73) Assignee: PREMIUM AEROTEC GMBH, Augsburg (DE)

( * ) Notice: Subject to any disclaimer, the term of this patent is extended or adjusted under 35 U.S.C. 154(b) by 740 days.

(21) Appl. No.: 15/450,267

(22) Filed: Mar. 6, 2017

(65) Prior Publication Data
US 2017/0252972 A1 Sep. 7, 2017

(30) Foreign Application Priority Data

Mar. 7, 2016 (DE) .................. 10 2016 002 623

(51) Int. Cl.
| | |
|---|---|
| B29C 67/00 | (2017.01) |
| B33Y 30/00 | (2015.01) |
| B33Y 10/00 | (2015.01) |
| B29C 71/02 | (2006.01) |
| B22F 3/105 | (2006.01) |
| B22F 3/24 | (2006.01) |
| B33Y 80/00 | (2015.01) |
| B33Y 40/00 | (2020.01) |

(52) U.S. Cl.
CPC ............ *B33Y 30/00* (2014.12); *B22F 3/1055* (2013.01); *B22F 3/24* (2013.01); *B29C 71/02* (2013.01); *B33Y 10/00* (2014.12); *B33Y 40/00* (2014.12); *B33Y 80/00* (2014.12); *B22F 2003/248* (2013.01); *B22F 2998/10* (2013.01); *B22F 2999/00* (2013.01); *B29C 2071/022* (2013.01); *Y02P 10/25* (2015.11)

(58) Field of Classification Search
CPC ........ B33Y 30/00; B33Y 40/00; B33Y 80/00; B33Y 10/00; B22F 3/24; B22F 3/1055; B22F 2999/00; B22F 2003/248; B22F 2998/10; B29C 71/02; B29C 2071/022; Y02P 10/295
See application file for complete search history.

(56) References Cited

U.S. PATENT DOCUMENTS

| | | |
|---|---|---|
| 6,278,050 B1 | 8/2001 | Urano et al. |
| 9,156,058 B2 | 10/2015 | Brandl et al. |

FOREIGN PATENT DOCUMENTS

| | | |
|---|---|---|
| DE | 10030887 B4 | 12/2007 |
| WO | WO 2008/125497 A1 | 10/2008 |
| WO | WO 2012/083922 A1 | 6/2012 |

OTHER PUBLICATIONS

German Office Action for Application No. 102016002623 dated Jan. 25, 2017.

*Primary Examiner* — Robert J Grun
(74) *Attorney, Agent, or Firm* — Jenkins, Wilson, Taylor & Hunt, P.A.

(57) ABSTRACT

A method for producing a component having defined dimensions from a blank having the same defined dimensions or having dimensions which differ from the defined dimensions of the component, by carrying out a heat treatment. Furthermore, a device for carrying out this method is disclosed.

10 Claims, 6 Drawing Sheets

METHOD AND DEVICE FOR PRODUCING COMPONENTS HAVING DEFINED DIMENSIONS

CROSS-REFERENCE TO RELATED APPLICATION

This application claims priority to German Patent Application DE 10 2016 002 623.5 filed Mar. 7, 2016, the entire disclosure of which is incorporated by reference herein.

TECHNICAL FIELD

The disclosure herein relates to a method for producing components having defined dimensions from blanks by carrying out heat treatment, and to a device for carrying out this method.

BACKGROUND

When producing components, such as components of vehicles, machines and in particular aircraft, amorphous substances such as powdered substances or melts are often processed in primary shaping methods into solid bodies having a geometrically defined three-dimensional shape. The solid body obtained during primary shaping is usually obtained in the form of a blank, which is further processed into the final component in subsequent manufacturing steps.

These subsequent manufacturing steps include changing the material properties, for example by heat treatment, thermomechanical treatment, sintering, magnetisation or irradiation. Whilst in these methods the material properties are often to be changed selectively so as to give the blank the required properties of the final component, the external dimensions of the blank are usually intended to remain unchanged in spite of the microscopic changes.

Depending on the primary shaping method and material properties of the blank, a blank may be obtained which does not have the desired dimensional stability under the conditions of a subsequent heat treatment to manufacture a component, and which therefore becomes geometrically deformed. The final component obtained after cooling no longer has the desired defined dimensions, even though the dimensions were predetermined when producing the blank. In particular, heat treatment is problematic whenever very narrow tolerances have to be adhered to.

SUMMARY

One of the ideas of the present disclosure is to specify a method, which is improved in particular as regards adhering to tolerances, for producing a component by heat-treating a blank.

The disclosure herein provides a method for producing a component having defined dimensions from a blank having the same defined dimensions or having dimensions which differ from the defined dimensions of the component, by carrying out heat treatment, comprising the steps of:
a) providing the blank;
b) fixing the blank using a fixing device;
c) carrying out a heat treatment step by heating the fixed blank to a predetermined temperature at which a change in the blank occurs, the defined dimensions of the blank and component being retained unchanged as a result of the fixing function of the fixing device, or deviations in the dimensions of the blank from the defined dimensions of the component being eliminated as a result of deforming forces from the fixing device acting on the fixed blank, and the defined dimensions of the component being achieved;
d) allowing the component fixed using the fixing device and having defined dimensions to cool; and
e) removing the fixing device.

As an example, step a) comprises providing a blank consisting of or comprising a material selected from the group of materials comprising metals, light metals, hard metals, metalloids, metal alloys, light metal alloys, super-alloys, semiconductors, fireproof materials, ceramic materials, inorganic polymers, organic polymers, composite materials, sinterable materials, individually or in combination.

Blanks made of light metals, such as magnesium, aluminium and titanium, and alloys thereof, such as Ti-6Al-4V, which used in particular as materials in aviation and aerospace, can be used.

Step a) can comprise producing a blank, for example consisting of or comprising one of the aforementioned materials, by a method comprising one or more of the following methods: casting, die-casting, injection molding, spray forming, sintering, machining, deep-drawing, compression, extrusion, generative manufacturing methods such as 3D printing methods, in particular titanium 3D printing methods.

It is particularly advantageous to carry out the method disclosed herein using blanks produced by a generative manufacturing method. Generative methods are disclosed, for example, in WO 2012/083922 A1 and WO 2008/125497 A1. One example of a generative manufacturing method is titanium 3D printing, which involves selective laser melting or electron beam melting in a powder bed, in which titanium or titanium alloys, such as Ti-6Al-4C, in powder form can be used.

The blank can be produced by a method in which a blank having closed pores is manufactured.

Step c) can lead to a change in the blank selected from one or more of the following changes: change in chemical properties such as the chemical composition, physical properties, the structure, the microstructure, the particle size, the particle size distribution, the porosity, such as open porosity and/or closed porosity, the pore shape, the pore size, for example by reducing pore size or eliminating pores, the pore size distribution, the macroscopic dimensions, the internal stresses, the surface finish, the density.

The special case included herein of a change in macroscopic dimensions means in particular that external forces on the blank and thus deviations from the desired dimensions of the component are eliminated as a result of fixing in the fixing device.

The heat treatment can be carried out according to step c) while applying pressure. This serves in particular to eliminate misalignments, defects or cavities such as closed pores, from the blank.

Step c) can comprise at least one of baking, nitriding such as gas nitriding, plasma nitriding, bath nitriding, annealing, metal infiltration, sinter compression, reaction sintering, vacuum sintering, inert gas sintering, spark plasma sintering, hot pressing, gas pressure sintering and hot isostatic pressing (HIP).

Hot isostatic pressing and compression of the blank can be carried out in step c). In the case of hot isostatic pressing, fixing the blank using a fixing device in step b) is particularly advantageous.

An alternative method, in which a blank manufactured by a generative manufacturing method is provided and is subsequently fixed using a fixing device and then subjected to hot isostatic pressing, is used in particular for producing components for aviation and aerospace engineering. Because of the material requirements applicable in this context, this method is for example carried out using light and/or tough metals, such as aluminium, magnesium, titanium or alloys thereof.

Step b) can comprise fixing the blank using the fixing device in such a way that rigid load paths are created between the fixing device and the blank, via which paths forces acting on the blank, such as internal stresses in the blank and/or the external force of gravity, are conducted away from the blank or component during the heat treatment step c).

As an example, fixing the blank using a fixing device as provided in step b) of the method comprises two variants based on different fixing principles so as to counter the deformation of the blank in the heat treatment step c) due to internal stresses or by external forces. These two advantageous embodiments are described in the following.

Step b) can comprise:

b1) gripping and/or supporting the blank using a gripping and/or supporting device which comprises one or more gripping elements and/or support elements which act on the blank at one or more points and grip and/or support it.

Step b) can comprise:

b2) supporting the blank in a supporting device comprising a vessel and a pourable or flowable support material, by introducing the blank into the vessel and filling the vessel with the support material in such a way that the support material clings to the contour of the blank so as to support it.

The support structure of step b1) of the method according to the disclosure herein, on which the blank can be fixed, is for example a contour-bound support structure or frame. A contour-bound support structure means a support structure which is attached directly and in a mechanically rigid manner to individuated points on the blank via one or more fastening elements. In this variant, component geometry-bound bracing is thus provided. Components and blanks have regions having high tolerance requirements. These regions can be gripped and fixed using the frame or the counter-bound support structure or the contour-bound tool. As a result, rigid load paths are produced which can conduct away occurring forces. The blank or the component is thus fixed in the initial position thereof. It is also possible to specifically predetermine deformations by the rigid connection between the blank and the frame via the connection elements, so as to compensate for deviations in preceding manufacturing processes.

Step b1) can include:

providing a gripping and/or supporting device in the form of a frame, which is stationary or the size and/or shape of which can be adapted to the size and/or shape of the blank.

Step b1) can include:

gripping the blank in the gripping device or gripping and supporting device by the gripping elements at one or more points on the blank having high tolerance requirements, so as to fix the blank and create rigid load paths via which forces acting on the blank, such as internal stresses in the blank and/or the external force of gravity, can be conducted away or compensated, thereby preventing deformations or deviations from the defined dimensions of the blank and of the component during the heat treatment in step c).

Step b1) can include:

gripping the blank in the gripping device or gripping and supporting device by the gripping elements at one or more points on the blank so as to fix the blank and to apply an external force to the blank, which force acts on the blank from the gripping device or gripping and supporting device via the gripping elements, in order, in the heat treatment step c), to compensate deviations of the blank from the desired defined dimensions entirely or in part and to achieve the desired defined dimensions of the component.

In the method, it is possible to bring about the fixing of the blank using a fixing device according to step b1) in combination with a fixing device according to step b2).

A supporting device has a supporting function and correspondingly formed support elements which support the blank from below and/or from the side. A gripping device has a gripping or clamping function by way of gripping or clamping elements provided specifically for this purpose. As a result of the gripping and clamping, this device always also simultaneously has a supporting function. It is possible to configure a fixing device in such a way that part of the device acts purely to support and another part acts to support and clamp.

The fixing device according to step b2) of the method, in which the blank can be fixed, may be a non-contour-bound fixing device or support structure, or in other words be a material which can cling to the contour, geometry or surface of the blank over a large surface area and thus conduct away the internal stresses in the blank or thus absorb the external force of gravity. This may be a filling consisting of or comprising bulk material. Since the bulk material clings to the contour of the blank, bracing independent of the component geometry is provided. In this variant, the blank and component can be braced by a non-contour-bound support structure. The blank or component is for example fastened in a vessel or shell. The vessel or shell or casing is subsequently filled up with a medium or filling. This filling could for example be poured in in such a way that the entire installation space is filled up. This can be achieved for example by vibrating and/or shaking the vessel. The vibration and/or shaking can ensure that the filling uniformly and completely fills the entire empty volume between the casing and the blank, and thus provides optimum fixing. Cavities within the blank are advantageously likewise filled with the bulk material in a general or shape-dependent manner. The particles of the bulk material can be of any desired shape. For example, individual bodies or particles in the filling are of a spherical shape, so as to ensure that the vessel and all the cavities of the component are filled in the most uniform possible manner. The size of these spheres is advantageously based on the level of detail of the workpiece.

When poured into the vessel and when filling up the cavities between the blank and the vessel wall and within the blank, a bulk material can be used to form an open-pore and thus substantially dimensionally stable structural material as a result of being enclosed by the vessel wall and the blank, which material in particular is not itself affected by the applied pressure during hot isostatic pressing and which, although it can surround the blank so as to fill the space, transmits the entire applied pressure to the blank and is not itself changed during the hot isostatic pressing. As a result of the flexibility of the bulk material particles, a bulk material is thus an ideal material for rapidly producing a fixing device without difficulties, irrespective of the contour of the blank. This is advantageous in particular for complex geometries of the blank. If the filling consists of a relatively lightweight and movable material, it may limit the fixing function to that of supporting. If the filling consists of a relatively heavy material that is compact in the filling, as in the case of sand, the fixing function may comprise both supporting and gripping the blank. For use in hot isostatic pressing, it is possible for the material of all fixing devices not to comprise any closed pores.

Step b2) can include:

providing a flexible gripping or support material in the form of a bulk material having a gripping or supporting effect; and/or Step b2) can include:

introducing the blank into the vessel and pouring in the flexible gripping or support material so as to obtain a blank which is completely covered in the gripping or support material.

Step b2) can include:

pouring in the support material so as completely to fill up the empty volumes between the blank and the vessel wall.

Step b2) can include:

pouring in the support material so as to fill up empty volumes within the blank.

Step b2) can include:

vibrating or shaking the vessel while and/or after pouring in the support material, so as to obtain the most uniform possible distribution and compression or compaction of the support material into the empty volumes between the blank and the vessel wall and if applicable within the blank.

Step b2) can include:

using a bulk material comprising particles which are of an approximately spherical structure. Two types of bulk material may be present; a pure powder or compressed spheres. Where the term "sphere" is used in the context of pure powder, this is an idealised conception. Particles and powder of corresponding particle size can or should have an approximately spherical structure, but in reality this is only very rarely the case.

Step b2) can include:

using a bulk material consisting of or comprising particles, the size of which is adapted to the level of detail of the component.

Step b2) can include:

using a pourable and curable medium as a support material.

In step b), it is possible to use a fixing device consisting of or comprising a material or material combination having one or more of the following properties. Thermal expansion coefficient α for example corresponds to thermal expansion coefficient α of the blank or differs by at most 5% from thermal expansion coefficient of the blank. The material of the fixing device for example has a similar expansion coefficient to the blank, component or workpiece. Differences in thermal expansion coefficients between the blank or component and the fixing device lead to stresses during the heat treatment. Stresses of this type can have a negative effect on the distortions of the blank, component or workpiece, and therefore thermal expansion coefficient could for example be selected with a view to reducing these stresses. For a metal blank, in particular a titanium or titanium alloy blank, the average thermal expansion coefficient $\alpha_{30-1000}$ at 30 to 1000° C. is advantageously in the range of from $5 \cdot 10^{-6}$ $K^{-1}$ to $15 \cdot 10^{-6}$ $K^{-1}$.

In step b), it is possible to use a fixing device consisting of or comprising a material or material combination of which the modulus of elasticity is sufficiently high that, during heating, the fixing device can absorb loads without becoming deformed. The material of the fixing device should be suitable for the expected temperatures during the heat treatment process and have a corresponding temperature resistance. The modulus of elasticity of the material or material combination is for example in the range of from 200 to 400 GPa.

It is possible for the material or material combination of the fixing device to be metallurgically compatible with the material of the blank or workpiece. If the materials are not sufficiently metallurgically compatible, diffusion or solid body diffusion between the fixing device and the blank, workpiece or component may occur during the heating in step c).

It is possible for the material or material combination of the fixing device to comprise a ceramic material selected from one or more of silicate ceramic, oxide ceramic and non-oxide ceramic materials. Ceramic materials, high-temperature-resistant materials are fire-resistant materials are materials that are particularly well suited to the application provided herein at high temperatures. As a material or material combination for producing the fixing device, a material can comprise one or more of $Al_2O_3$, $ZrO_2$, $TiO_2$, $Al_2TiO_5$, $Al_2O_3$—$ZrO_2$ mixed oxide and SiC. As well as the use of pure powders such as $Al_2O_3$, $SiO_2$, $TiO_2$, etc., it is further also possible to use powder mixtures (for example mullite, chamotte etc.). These mixtures, like the pure powders themselves, may also be pressed into the shape of macroscopically visible spheres by a separate method and subsequently supplied to the process as a support material.

According to a further aspect, another embodiment of the disclosure herein provides a method for producing a metal component having defined dimensions from a metal blank having the same defined dimensions or having dimensions which differ from the defined dimensions of the metal component, by carrying out heat treatment, comprising at least one or more or all of the following steps:

producing a metal blank by a generative manufacturing method, such as using a 3D printer, from a metal powder such as titanium powder or titanium alloy powder, for example from Ti-6Al-4V;

fixing the metal blank using a fixing device;

annealing and/or hot isostatic pressing (HIP) of the metal blank fixed using the fixing device;

allowing the component fixed using the fixing device to cool; and removing the fixing device.

The component can both be annealed at low stress and undergo hot isostatic pressing. The sequence and presence or one or other heat treatment method may vary. This results in four variants:

1. HIP;
2. annealing;
3. HIP+annealing;
4. annealing+HIP.

The disclosure herein further provides a device for producing a component having defined dimensions from a metal blank having the same defined dimensions or having dimensions which differ from the defined dimensions of the component as a result of deformations of the blank, by carrying out heat treatment. The device comprises the following components:

a blank production unit for providing the blank, a fixing device for fixing the blank, a heat treatment device for carrying out a heat treatment step by heating the blank fixed in the fixing device to a predetermined temperature at which a change in the blank occurs, the fixing device being configured in such a way that the defined dimensions of the blank and final component are retained unchanged as a result of the fixing function of the fixing device, or that deformations in the blank under the effect of forces from the fixing device while obtaining the defined dimensions of the final component are eliminated.

It is possible for the blank production unit to comprise a 3D laser printer or electron beam printer for selective laser melting or electron beam melting in a powder bed and/or a device for carrying out a generative manufacturing method, such as the plasma deposition method of Norsk Titanium, to produce the blank.

It is possible for the fixing device for fixing the blank to be configured in such a way that rigid load paths are created between the fixing device and the blank, via which paths forces acting on the blank, such as internal stresses in the blank and/or the external force of gravity, are conducted away during the heat treatment step c).

It is possible for the fixing device to be formed from a material or material combination in which thermal expansion coefficient α corresponds to thermal expansion coefficient α of the blank or differs by at most 5% from thermal expansion coefficient of the blank.

It is possible for the fixing device to be formed from a material or material combination in which the average thermal expansion coefficient $\alpha_{30-1000}$ at 30 to 1000° C. is for example in the range of from $5 \cdot 10^{-6}$ $K^{-1}$ to $15 \cdot 10^{-6}$ $K^{-1}$.

It is possible for the fixing device to be formed from a material or material combination in which the modulus of elasticity of the material or material combination is sufficiently high that, during heating, the fixing device can absorb loads without becoming deformed in the process.

It is possible for the fixing device to be formed from a material or material combination in which the modulus of elasticity is in the range of from 200 to 400 GPa.

It is possible for the fixing device to be formed from a material or material combination in which the material or material combination of the fixing device is metallurgically compatible with the material of the blank.

It is possible for the fixing device to be formed from a material or material combination in which no diffusion or solid body diffusion occurs between the fixing device and the blank during heating.

It is possible for the fixing device to be formed from a material or material combination in which the material or material combination of the fixing device comprises a ceramic material selected from one or more of silicate ceramic, oxide ceramic and non-oxide ceramic material.

It is possible for the fixing device to be formed from a material or material combination comprising one or more of $Al_2O_3$, $ZrO_2$, $TiO_2$, $Al_2TiO_5$, $Al_2O_3$—$ZrO_2$ mixed oxide, SiC. As well as the use of pure powders such as $Al_2O_3$, $SiO_2$, $TiO_2$, etc., it is further also possible to use powder mixtures (for example mullite, chamotte, etc.). These mixtures, like the pure powders themselves, may also be pressed into the form of macroscopically visible spheres by a separate method and subsequently used as a support material.

It is possible for the fixing device to comprise a gripping and/or supporting device for gripping and/or supporting the blank, which comprises one or more gripping elements and/or support elements which act on the blank at one or more points and grip and/or support it.

It is possible for the fixing device to comprise a supporting device for supporting the blank, comprising a vessel and a pourable or flowable support material which can be introduced into the vessel so as to cling to the contour of the blank and support the blank.

It is possible for the fixing device to be a gripping device or gripping and supporting device for gripping the blank by the gripping elements at one or more points on the blank having high tolerance requirements so as to fix the blank and create rigid load paths, via which forces acting on the blank, such as internal stresses in the blank and/or the external force of gravity, are conducted away or compensated, thereby preventing deformations or deviations from the defined dimensions of the blank and of the component during the heat treatment in step c).

It is possible for the fixing device to be a gripping device or gripping and supporting device for gripping the blank by the gripping elements at one or more points on the blank so as to fix the blank and to apply to the blank an external force which acts on the blank from the gripping device or gripping and supporting device via the gripping elements, in order, in the heat treatment step c), to compensate deviations of the blank from the desired defined dimensions entirely or in part and to achieve the desired defined dimensions of the component.

It is possible for the device to comprise a vibration or shaking device for filling the vessel and/or all the cavities of the component as uniformly as possible.

It is possible for the device to comprise a bulk material comprising particles which are of an approximately spherical structure. Two types of bulk material may be present; a pure powder or compressed spheres. Where the term "sphere" is used in the context of pure powder, this is an idealised conception. Particles and powder of corresponding particle size can or should have an approximately spherical structure, but in reality this is only very rarely the case.

It is possible for the device to comprise a bulk material consisting of or comprising particles, the size of which is adapted to the level of detail of the component.

It is possible for the device to comprise a pourable and curable medium as a support material.

In accordance with this disclosure, it has been found that the heat treatment can lead to a reduction in the modulus of elasticity of the material of which the blank consists, and to mechanical destabilization of the blank. This applies in particular to metals, metal alloys and materials having a metal component, such as composite materials. As a result, internal stresses in the blank and/or internal stresses occurring during heating and/or external forces such as gravity can take effect and can bring about a deformation of the blank away from the originally predetermined defined dimensions that are actually desired. Thus, during the heat treatment, free forces, internal stresses in the blank or external loads acting on the blank, such as gravity, can lead to geometric distortions of the heat-treated components.

As a result of fixing the blank using a fixing device, it is possible to counter these internal stresses and forces and thus these deformations. Using the fixing device, the dimensional accuracy of the components producing by heat treatment is improved. As a result of fixing the component or the component geometries, the aforementioned distortions can be minimised or reduced. Fixing the blank prior to the heat treatment using a fixing device makes it possible to heat a blank having defined dimensions to a sufficiently high temperature in the heat treatment step c) that the desired change in one or more material properties occurs and that, in spite of the effect of forces such as internal stresses and gravity, a component is obtained having the same defined dimensions as were predetermined in the blank. As a result of the heat treatment of the blank, a change in the blank is obtained in which, because of the fixing function of the fixing device, the defined dimensions predetermined using the blank are completely or substantially retained in the finished component.

The fixing device may be a contour-bound or non-contour-bound support structure. "Contour-bound" means that the fixing device or support structure is rigidly connected via elements to discretely and selectively chosen points on the blank. "Non-contour-bound" means that the fixing device as a whole engages on or rests against the blank in a planar manner, the effect thereof thus being able to take place irrespective of the specific contour of the blank. These fixing devices also include component-geometry-bound supports and component-geometry-independent supports.

In an embodiment, the blank is intended to already have the defined dimensions of the component prior to the heat treatment. However, it may be that, as a result of the preceding manufacturing process such as the above-described primary shaping, the blank deviates from the defined dimensions of the finished component. In this case, by the fixing device, deformations could be selectively predetermined which, during the heat treatment step c), compensate these deviations resulting from preceding manufacturing processes. The deformations are predetermined by fixing the blank using the fixing device in such a way that forces act selectively on the fixed blank from the fixing device, such that the deviations from the desired defined dimensions are compensated or eliminated completely or in part during heating.

Thus, fixing refers to any mechanical means, structure or device in contact with the blank which holds the blank in place in the current shape thereof prior to heating. Fixing further means exerting a force on the blank which counters a gravitational force acting on the blank or stresses present in the blank and which compensates the gravitational force and/or stresses in such a way that the desired shape is retained even in the heated and softened state. Fixing means, for example, gripping, mounting, clamping, supporting, supporting from below or laterally bracing in order to compensate these forces or render them ineffective. Fixing may also mean establishing mechanical contact with the blank and allowing forces to act on the blank from the fixing device with the aim of eliminating or compensating deformations present in the blank under the effect of heat.

By supporting the workpiece during the heat treatment, distortions can be prevented or reduced in a simple manner. Alternative variants of the method differ in the type of support structure, but are otherwise similar in application. Prior to the heat treatment step, the support materials are attached to the component, and the component is thus fixed. During the heat treatment, occurring loads can be dissipated from the component through the support material. This reduces and prevents distortion. After cooling, the support structures can be removed and reused in a simple manner.

The disclosure herein relates in particular to fixing metal components during heat treatment in order to reduce geometric distortions.

BRIEF DESCRIPTION OF THE DRAWINGS

Embodiments of the disclosure herein are explained in greater detail in the following on the basis of the accompanying drawings, in which.

DETAILED DESCRIPTION

1. Preliminary Test

Figure 1:
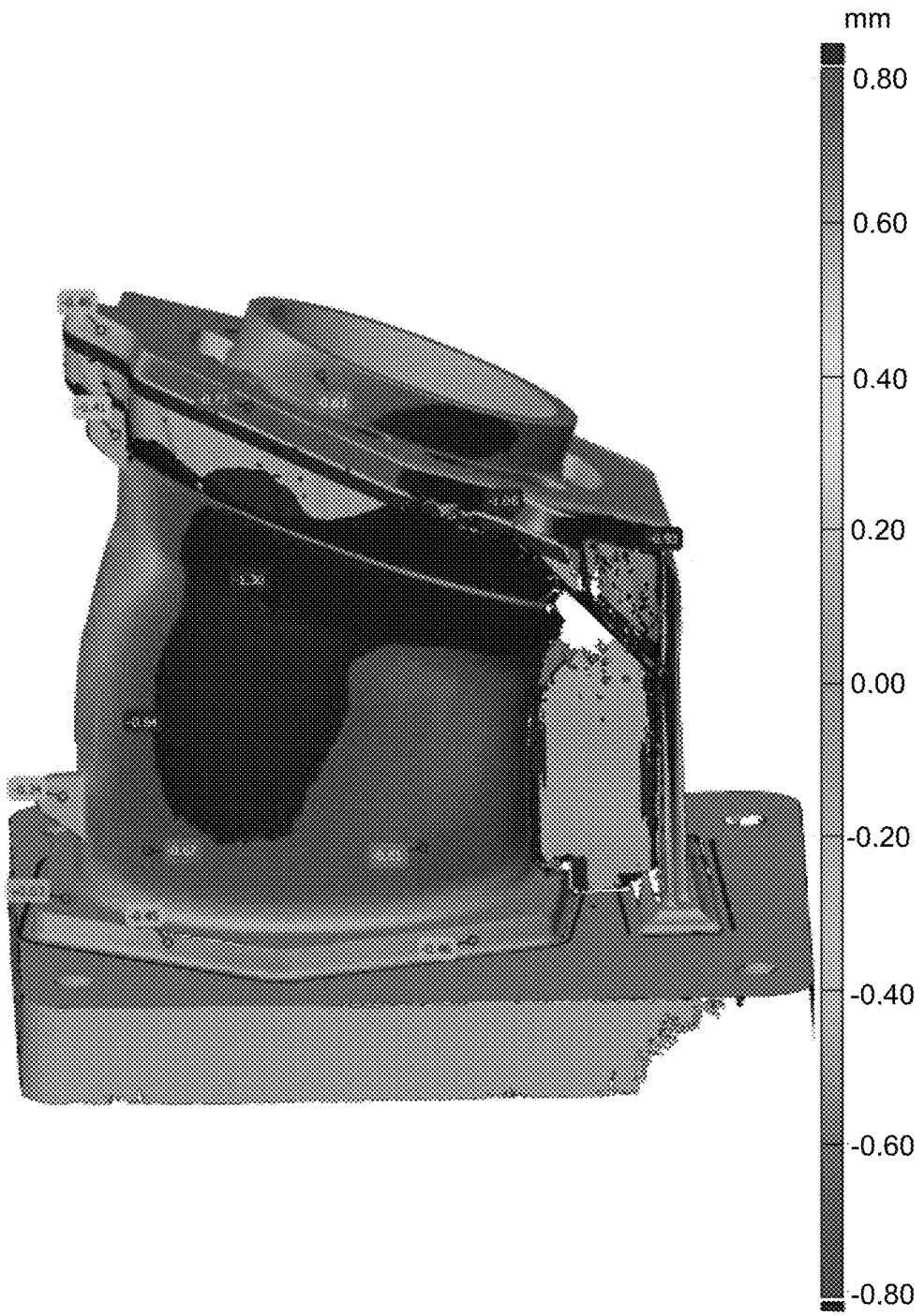
FIG. 1 shows an example of a component in the form of a metal pipe after hot isostatic pressing without fixing.

FIG. 1 shows the typical distortions in a metal component, for example a pipe, which has undergone hot isostatic pressing without a fixing device. The distortions are of different magnitudes at different points on the pipe bend as a result of a different load. Geometric distortions as a result of internal stresses or external gravity in the range of up to ±1 mm are found.

The following is a description of a method for producing a component having defined dimensions from a blank having the same dimensions. A blank is provided which is then fixed using a fixing device. Subsequently, the blank fixed in this manner is subjected to heat treatment by hot isostatic pressing. After the pressing process is complete, the component is cooled in the fixing device and then separated from the fixing device.

2. Producing a Metal Pipe Branch by a Generative Manufacturing Method

Initially a blank, in this case for example in the form of a pipe branch, is produced. A powdered titanium alloy consisting of Ti-6Al-4V, for example, is used as a starting material. The alloy powder is formed into a blank 300 in a laser beam or electron beam powder bed production device 402. The production device 400 comprises an energy beam generation device 404, an energy beam guidance device 406, a powder bed 408 comprising a moveable production platform 410, and a powder application device 412. Furthermore, a control device 414 for controlling the production method is provided. In particular, the control device 414 controls the energy beam guidance device 506, the production platform 410 and the powder application device 412.

The energy beam generation device 404 is for generating a high-energy beam by which material powder can be converted to a solid form. For example, the energy beam generation device is used to generate a high-energy laser beam or an electron beam by which material powder 416 can be melted or sintered.

The material powder 416 can be arranged on the production platform 410 in thin powder layers from a first powder reservoir 418 and/or a second powder reservoir 420 by the powder application device 412.

Data relating to the shape of the component 1, 300 in the form of a pipe branch, for example CAD data, are inputted into the control device 414; the control device 414 subsequently guides the energy beam 422 by the energy beam guidance device 406 in such a way that the entire cross section of the pipe branch 1, 300 at the height of this layer is hardened. Subsequently, the control device 414 moves the production platform 410 downwards by a particular amount, so as to apply the next layer of powder and harden the cross section again.

By this laser or electron beam powder bed method, which is known per se, a complicated shape of component blank 300, such as a pipe branch, can also be produced integrally as a single piece.

Figure 2:
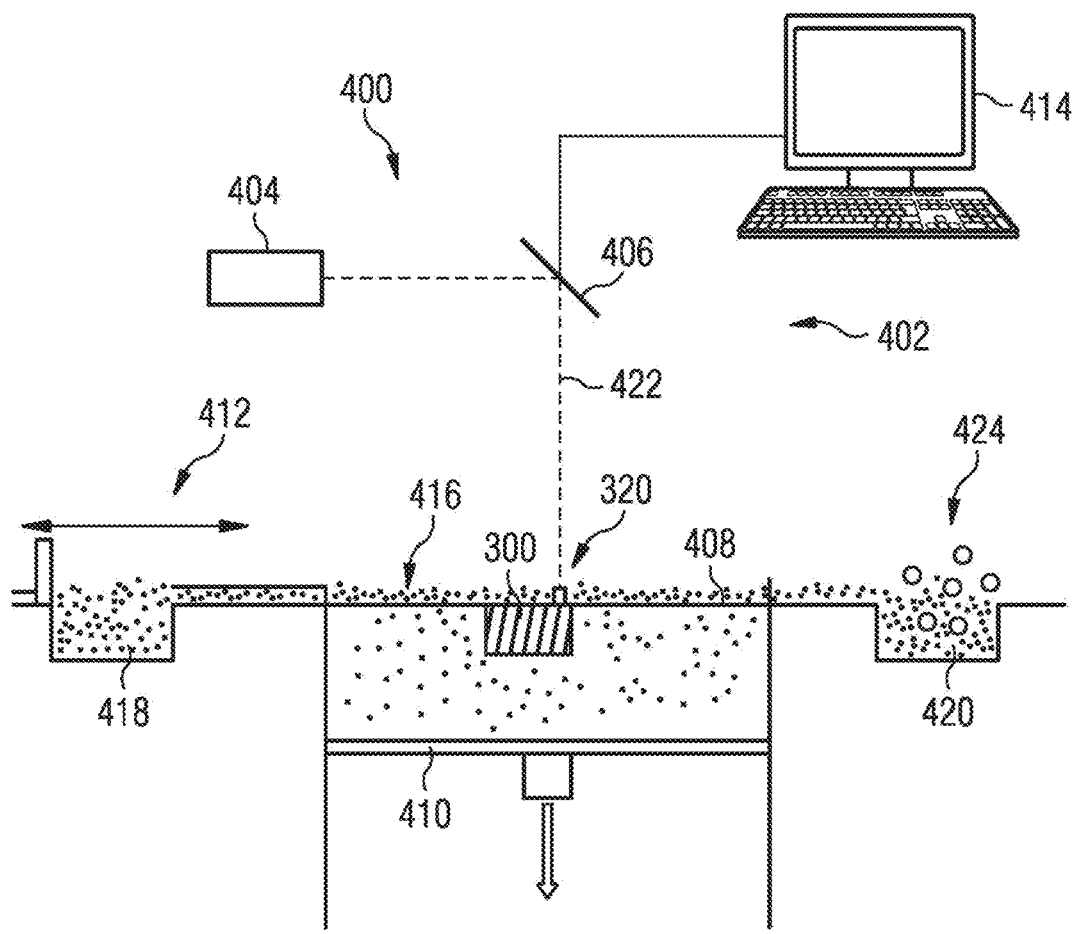
FIG. 2 shows a device for producing a blank, for example a 3D titanium laser printer for selective laser melting in a powder bed.

Furthermore, in the production device 400 shown in FIG. 2, it is possible to apply different material powder 416 in different layers. For example, the first powder reservoir 418 contains a first material powder 416 and the second powder reservoir 420 contains a second material powder 424. Thus, by the powder application device 412, either the first material powder 416 or the second material powder 424 or else mixtures having different compositions of the first material powder 416 and the second material powder 424 can be applied selectively in different layers.

By this laser or electron beam powder bed method, which is known per se, the blank 300 of the component 1 can be produced integrally as a single piece.

The blank 300 thus produced contains closed pores which are to be removed by a subsequent heat treatment in the form of hot isostatic pressing so as to obtain a pore-free, mechanically more stable component which simultaneously has unchanged dimensions.

3. Producing the Fixing Device—Selecting the Material for the Fixing Device

The hot isostatic pressing should be carried out at a temperature of 1000° C. and a pressure of 1000 bar. For this purpose, the blank 300 should be fixed in a fixing device 4. A fixing device 4 is provided made of a material which has the required properties under the method conditions of hot isostatic pressing.

Figure 3:
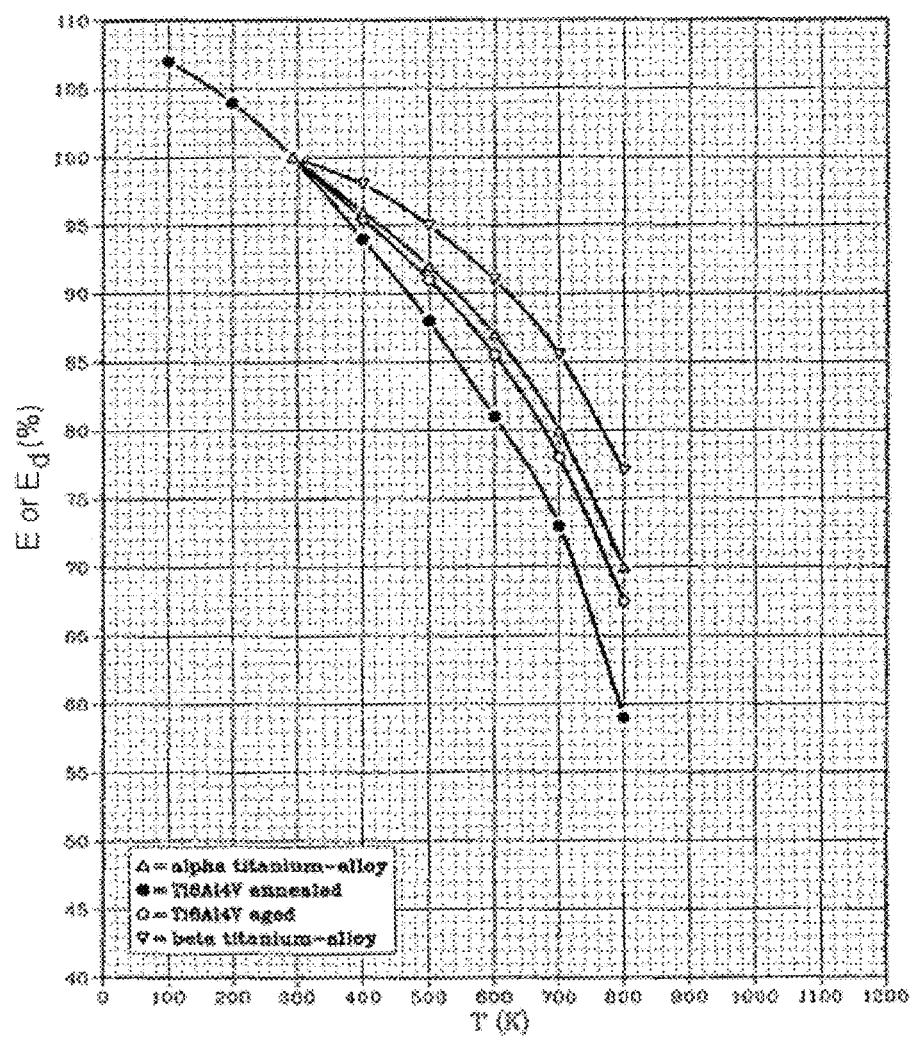
FIG. 3 is a graph showing the modulus of elasticity of different titanium alloys, including Ti-6Al-4V, as a function of temperature.

FIG. 3 shows the temperature dependency of the modulus of elasticity of different titanium alloys, including Ti-6Al-4V. At 1000° C., and therefore at the working temperature during hot isostatic pressing, the alloys have a greatly reduced modulus of elasticity. The blank 300 consisting of Ti-6Al-4V is therefore gripped in a gripping device 14 for the hot isostatic pressing. The gripping device 14 is a first example of the fixing device 4.

The gripping device 14 is produced from a material which has a sufficiently high modulus of elasticity at 1000° C. that it can fix the blank 30 and the component 1 formed there-from—for example a pipe branch—at this high temperature.

Further, the material of the gripping device 14 has a thermal expansion coefficient that is as similar as possible to that of Ti-6Al-4V at 1000° C.

Figure 4:
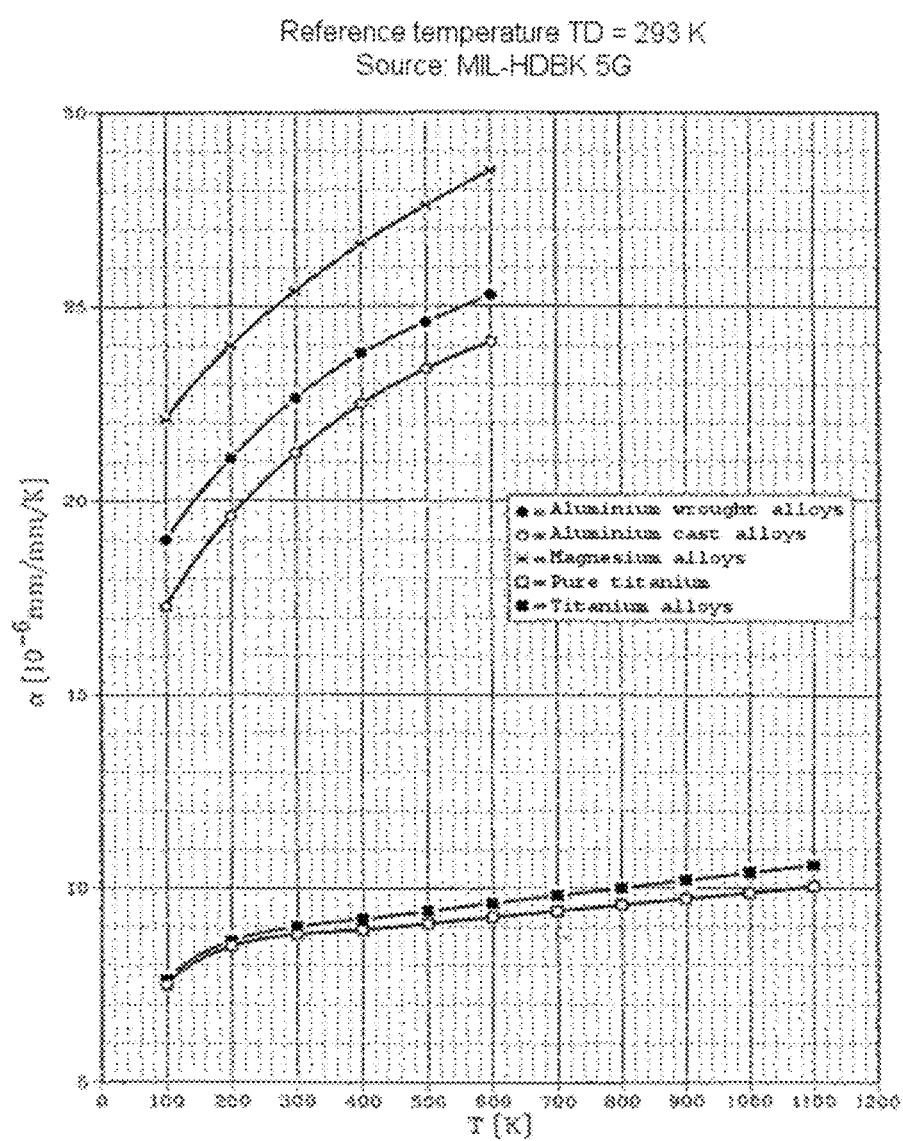
FIG. 4 is a graph showing thermal expansion coefficients of metal materials from aviation and aerospace, including Ti-6Al-4V, as a function of temperature.
Figure 5:
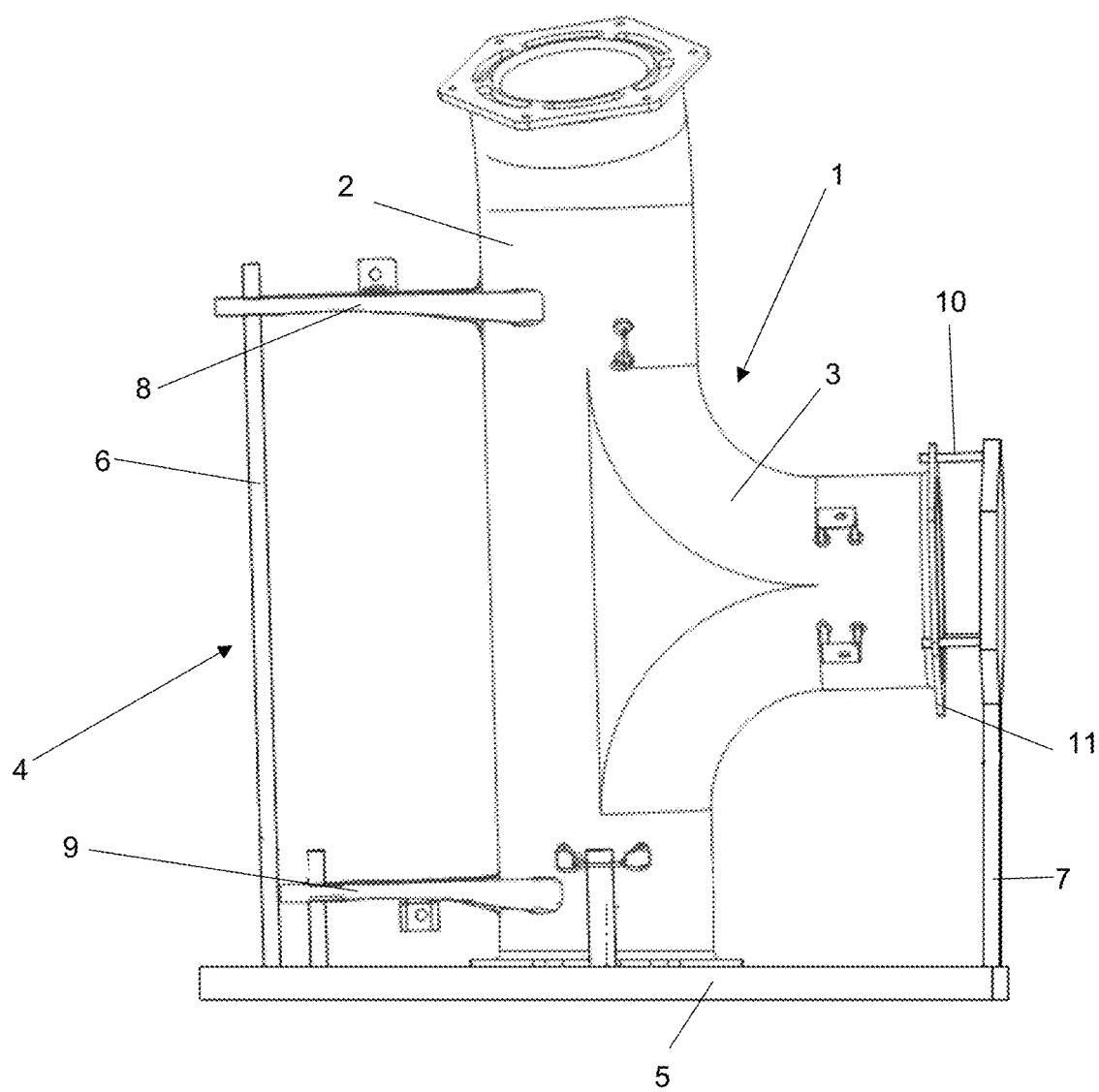
FIG. 5 shows a gripping device in which a pipe branch blank is gripped for hot isostatic pressing.
Figure 6:
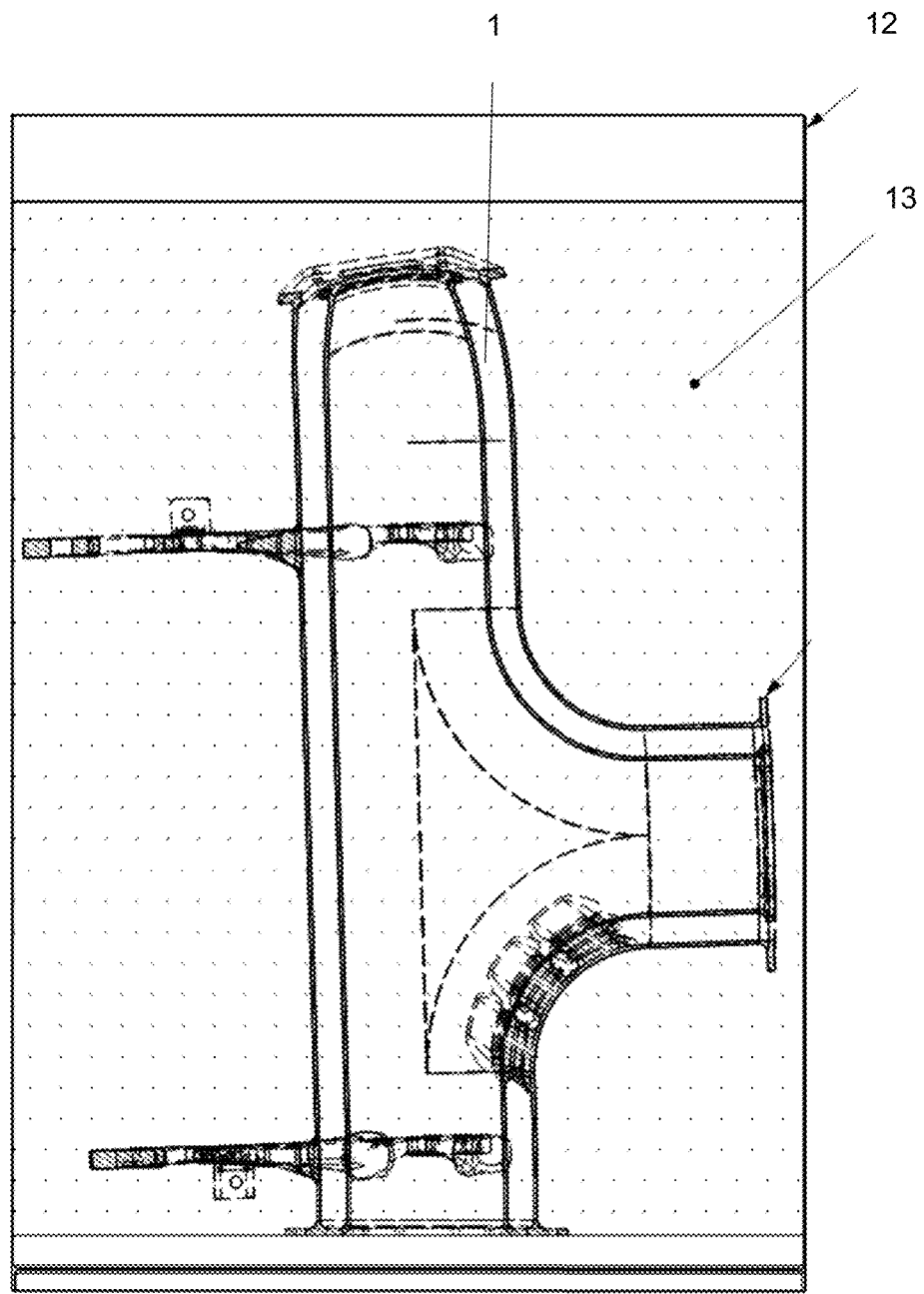
FIG. 6 shows a supporting device consisting of or comprising a shell and bulk material, in which device a pipe branch blank is gripped for hot isostatic pressing.

FIG. 4 shows the temperature dependency of thermal expansion coefficients of different alloys for aviation and aerospace. Titanium alloys have a thermal expansion coefficient of from approximately $9 \cdot 10^{-6}$ mm/mm/K to 11.10-6 mm/mm/K. Thus, a material having a thermal expansion coefficient (a) in a range of from approximately $9 \cdot 10^{-6}$ mm/mm/K to $11 \cdot 10^{-6}$ mm/mm/K is also used for the gripping device.

A third selection criterion for the material of the gripping device 14 relates to the metallurgical compatibility between the titanium alloy and the gripping device 14. There should be as little solid body diffusion as possible between the blank 300 or component 1 and the gripping device 14. Materials which can prevent solid body diffusion are, inter alia, ceramic materials such as silicate ceramic, oxide ceramic and non-oxide ceramic materials.

The accompanying table shows the mechanical properties of oxide ceramic materials, in this case aluminium oxide, the mixed oxide ceramic ZTA consisting of $Al_2O_3 + ZrO_2$, partially stabilized zirconium oxide, titanium oxide and aluminium titanate. The oxide ceramic materials have a high modulus of elasticity.

The accompanying table further shows that the mixed oxide ceramic ZTA consisting of $Al_2O_3 + ZrO_2$ has an average thermal expansion coefficient $\alpha$ of $9\text{-}10[\cdot 10^{-6}\ K^{-1}]$ at operating temperatures of 900-1600° C. This value corresponds to the target value range specified above. Thus, the mixed oxide ZTA ($Al_2O_3 + ZrO_2$) is the material best suited to producing the gripping device 4 according to the disclosure herein. ZTA is also used for the filling 13 for the second embodiment according to the disclosure herein.

TABLE

|  | Symbol | Unit | $Al_2O_3$ | $Al_2O_3 + ZrO_2$ | $ZrO_2$ | $TiO_2$ | AlTi |
|---|---|---|---|---|---|---|---|
| MECHANICAL |  |  |  |  |  |  |  |
| Open porosity |  | [Vol.-%] | 0 | 0 | 0 | 0 | 10-16 |
|  | $\rho$ |  | 4.0 | 4.32-5.28 | 5.6 | 3.5 | 3.0-3.7 |
|  | $\sigma B$ | [MPa] | 300-520 | 400-800 | 500-1000 | 400-600 | 15-100 |
| Density, min. | E | [GPa] | 300-380 | 240-350 | 200-210 | — | 10-50 |
| Flexural strength | HV | [$10^2\ Nmm^{-2}$] | 17-23 | 14-20 | 11-12.5 | — | 5 |
| Stress intensity factor | $K_{IC}$ | [MPa m] | 4-5.5 | 4.5-9 | 5.8-10.5 | — | 3-5 |
| ELECTRICAL |  |  |  |  |  |  |  |
| Dielectric strength | $E_d$ | [$kVmm^{-1}$] | 17 | — | — | 8 | — |
| Withstand voltage, min. | U | [kV] | 20 | — | — | 15 | — |
| Permittivity 48-62 Hz | $\epsilon r$ | [—] | 9 | 12-18 | 22 | 40-100 | — |
| Dissipation factor at 20° C., 48-62 Hz | $\tan\delta_{pf}$ | [$10^{-3}$] | 0.2-0.5 | — | — | — | — |
| Dissipation factor at 20° C., 1 MHz | $\tan\delta_{1M}$ | [$10^{-3}$] | 1 | — | — | 2 | — |
| Resistivity at 20° C. | $\rho V_{>20}$ | [$\Omega cm$] | $10^{12}\text{-}10^{15}$ | $10^7\text{-}10^{11}$ | $10^8\text{-}10^{13}$ | $10^{10}$ | $10^{14}$ |
| Resistivity at 600° C. | $\rho V_{>600}$ | [$\Omega cm$] | $10^6$ | $10^3\text{-}10^5$ | $10^3\text{-}10^6$ | — | $10^9$ |
| THERMAL |  |  |  |  |  |  |  |
| Average length expansion coefficient at 30-1000° C. | $\alpha_{30\text{-}1000}$ | [$10^{-6}\ K^{-1}$] | 7-8 | 9-10 | 10-12.5 | 6-8 | 0.5-2 |
| Specific heat capacity at 30-600° C. | $CP_{30\text{-}1000}$ | [$Jkg^{-1}K^{-1}$] | 850-1050 | 400-850 | 400-550 | 700-800 | 800 |
| Thermal conductivity | $\lambda_{30\text{-}100}$ | [$Wm^{-1}K^{-1}$] | 19-30 | 2-25 | 1.5-3 | 3-4 | 1.5-3 |
| Thermal shock resistance |  |  | good | good | good | — | extremely good |

TABLE-continued

| | Symbol | Unit | Al$_2$O$_3$ | Al$_2$O$_3$ + ZrO$_2$ | ZrO$_2$ | TiO$_2$ | AlTi |
|---|---|---|---|---|---|---|---|
| Typical max. operating temperature | T | [° C.] | 1400-1700 | 900-1600 | 900-1600 | –1000 | 900-1600 |

Engineering ceramic data sheet: source: www.klaeger.de

4. Hot Isostatic Pressing of the Blank Gripped in a Gripping Device Consisting of or Comprising ZTA A gripping device 14 consisting of or comprising ZTA is used for griping the pipe branch blank 1. The gripping device 14 comprises a base plate 5 and two vertical rods 6, 7 fastened thereto. An upper gripping element 8 and a lower gripping element 9 extend horizontally and in parallel with one another from the vertical rod 6. The two gripping elements engage on a cylindrical body of a vertical pipe portion 2 and firmly grip the vertical pipe portion 2. The vertical rod 7 comprises a hexagonal hollow element at the upper end thereof, which element is connected by three horizontal connecting pieces 10 to a circular support element 11. The end of the horizontal pipe portion 3 is mounted and braced in this circular support element 11. The fixing elements 8 and 9 thus having a gripping function; the fixing element 11 has a support function.

The gripping occurs at those points that are intended to have particular dimensional accuracy relative to one another. Thus, the points where particular tolerances are demanded are selectively supported relative to one another.

The blank 300 gripped in this gripping device 14 consisting of or comprising ZTA is hardened by hot isostatic pressing at 1000° C. and 1000 bar, so as to obtain the component 1.

After cooling, the component 1 is released from the gripping device 14. The component 1 has no distortions or deformations. The required dimensions of the finished component 1 correspond to the dimensions of the blank 300.

5. Hot Isostatic Pressing of the Blank Supported in a Vessel Using a Bulk Material Consisting of ZTA A blank 300—for example of a pipe branch—identical to that of the preceding example is used. Instead of fixing the blank 300 in the gripping device 14 consisting of ZTA, the blank 300 is placed in a casing 12. Subsequently, a filling 13 of granular ZTA is poured into the casing 12 and completely fills all the cavities in the blank 300 as well as the empty volume between the blank 300 and the casing 12. In this way, the blank 300 is braced completely and over a large surface area by the filling 13.

Thus, in this example the fixing device 4 comprises a vessel—the casing 12—and a support material 15—the filling 13.

The support material 15 is selected in a manner similar to that described previously for the material of the gripping device 14. For example, a bulk material consisting of particles of ZTA is used as the support material 15.

The support material 15 has in particular spherical particles, the particle size of which is selected in accordance with the precision requirements for the contour of the component 1.

If a very high level of detail precision is required, a very small particle size is selected. If the requirements for the detail precision are lower, the particles may be larger.

The blank 300 supported by the ZTA filling 13 is hardened by hot isostatic pressing at 1000° C. and 1000 bar in order to thus obtain the component 1.

After cooling, the component 1 is removed from the filling 13. The component 1 has no distortions or deformations. The dimensions of the finished component 1 correspond to the dimensions of the blank 300.

According to another example, a pourable and curable medium such as gypsum or the like is used as the support material and is chipped off after the heat treatment.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for producing a component having defined dimensions from a blank having identical defined dimensions or having dimensions which differ from the defined dimensions of the component, by carrying out heat treatment, comprising the steps of:
   a) providing the blank;
   b) fixing the blank using a fixing device, wherein the fixing device comprises a gripping device or a supporting device, in a form of:
      a frame, wherein the frame is stationary or of a size or shape of which can be adapted to a size or shape of the blank; or
      a vessel and a pourable or flowable support material;
   wherein fixing the blank using the fixing device comprises:
      gripping or supporting the blank using the frame which comprises one or more gripping elements or support elements which act on the blank at one or more points and grip or support the blank; and
   wherein gripping or supporting the blank comprises:
      gripping the blank in the gripping device or gripping and supporting device by the gripping elements at one or more points on the blank having defined tolerance requirements to fix the blank and create rigid load paths, via which forces acting on the blank, including internal stresses in the blank or external force of gravity, are conducted away or compensated, as a result of which deformations or deviations from the defined dimensions of the blank and of the component during the heat treatment in step c) are prevented; or
      gripping the blank in the gripping device or gripping and supporting device by the gripping elements at one or more points on the blank to fix the blank and to apply to the blank an external force which acts on the blank from the gripping device or gripping and supporting device via the gripping elements, in order, in the heat treatment step c), to compensate deviations of the blank from the desired defined dimensions entirely or in part and to achieve the desired defined dimensions of the component;

c) carrying out a heat treatment step by heating the fixed blank to a predetermined temperature at which a change in the blank occurs, the defined dimensions of the blank and component being retained unchanged as a result of the fixing by the fixing device, or deviations in the dimensions of the blank from the defined dimensions of the component being eliminated as a result of deforming forces from the fixing device acting on the blank, and the defined dimensions of the component being achieved;

d) allowing the component fixed using the fixing device and having defined dimensions to cool; and e) removing the fixing device.

2. The method of claim 1,
wherein step a) of providing the blank comprises:
a1) providing a blank consisting of or comprising a material selected from the group consisting of: metals, light metals, hard metals, metalloids, metal alloys, light metal alloys, superalloys, semiconductors, fireproof materials, ceramic materials, inorganic polymers, organic polymers, composite materials, and sinterable materials, individually or in combination.

3. The method of claim 1,
wherein step a) of providing the blank comprises:
a2) producing a blank by a method comprising at least one of casting, die-casting, injection molding, spray-forming, sintering, machining, deep-drawing, compression, extrusion, or generative manufacturing methods including 3D printing methods and/or titanium 3D printing methods.

4. The method of claim 1,
wherein step a) of providing the blank comprises:
a3) producing the blank having closed pores.

5. The method of claim 1,
wherein step c) of carrying out a heat treatment step leads to a change in the blank selected from one or more of the following: a change in a chemical property, a physical property, structure, microstructure, particle size, particle size distribution, porosity, open porosity, closed porosity, pore shape, and pore size, by reducing pore size or eliminating pores, the pore size distribution, macroscopic dimensions, internal stresses, surface finish, or density.

6. The method of claim 1,
wherein step c) of carrying out a heat treatment step comprises at least one of baking, nitriding, gas nitriding, plasma nitriding, bath nitriding, annealing, metal infiltration, sinter compression, reaction sintering, vacuum sintering, inert gas sintering, spark plasma sintering, hot pressing, gas pressure sintering, or hot isostatic pressing.

7. The method of claim 1,
wherein step b) of fixing the blank using a fixing device comprises one or more of the following: creating rigid load paths between the fixing device and the blank, via which paths forces acting on the blank, including internal stresses in the blank, and external force of gravity, are conducted away during the heat treatment step c).

8. The method of claim 1,
wherein step b) of fixing the blank using a fixing device comprises:
b2) supporting the blank in the supporting device comprising the vessel and pourable or flowable support material, by introducing the blank into the vessel and pouring the support material into the vessel such that the support material clings to a contour of the blank to support the blank.

9. The method of claim 8,
wherein step b2) of supporting the blank in a supporting device comprises:
b 5) providing a flexible gripping or support material in a form of a bulk material having a gripping or supporting effect; or
b 6) pouring in the support material completely to fill up empty volumes between the blank and a vessel wall; or
b 7) pouring in the support material to fill up empty volumes within the blank; or
b 8) vibrating or shaking the vessel while or after pouring in the support material, to obtain a most uniform possible distribution and compression of the support material into the empty volumes between the blank and the vessel wall or within the blank; or
b 9) using a bulk material comprising particles which have an approximately spherical structure;
b10) using a bulk material consisting of particles, a size of which is adapted to a level of detail of the component; or
b11) using a pourable and curable medium as a support material.

10. The method of claim 1,
wherein a fixing device is used in step b) that consists of a material or material combination having one or more or all of features as follows:
thermal expansion coefficient $\alpha$ corresponds to thermal expansion coefficient $\alpha$ of the blank or differs by at most 5% from thermal expansion coefficient of the blank;
average thermal expansion coefficient $\alpha_{30\text{-}1000}$ at 30 to 1000° C. is in a range of from $5 \cdot 10^{-6}$ $K^{-1}$ to $15 \cdot 10^{-6}$ $K^{-1}$;
modulus of elasticity of the material or material combination is sufficiently high that, during heating, the fixing device can absorb loads without becoming deformed;
the modulus of elasticity of the material or material combination is in a range of from 200 to 400 GPa;
the material or material combination of the fixing device is metallurgically compatible with the material of the blank;
no diffusion or solid body diffusion between the fixing device and the blank occurs during heating;
the material or material combination of the fixing device comprises a ceramic material comprising one or more of silicate ceramic, oxide ceramic, and non-oxide ceramic materials;
the material or material combination of the fixing device comprises one or more of $Al_2O_3$, $ZrO_2$, $TiO_2$, $Al_2TiO_5$, $Al_2O_3$—$ZrO_2$ mixed oxide, and SiC.

\* \* \* \* \*